United States Patent
Warner et al.

(10) Patent No.: US 12,535,473 B2
(45) Date of Patent: Jan. 27, 2026

(54) INTRINSICALLY SAFE AND EXPLOSION PROOF ENCLOSURE FOR CONVERTIBLE GAS DETECTORS

(71) Applicant: Carrier Corporation, Palm Beach Gardens, FL (US)

(72) Inventors: Tanner Warner, Chanhassen, MN (US); Zach Pennaz, Andover, MN (US)

(73) Assignee: DETECTOR ELECTRONICS BUYER US, LLC, Stamford, CT (US)

( * ) Notice: Subject to any disclaimer, the term of this patent is extended or adjusted under 35 U.S.C. 154(b) by 621 days.

(21) Appl. No.: 18/045,244

(22) Filed: Oct. 10, 2022

(65) Prior Publication Data
US 2023/0126275 A1     Apr. 27, 2023

Related U.S. Application Data

(60) Provisional application No. 63/262,986, filed on Oct. 25, 2021.

(51) Int. Cl.
*G01N 33/00*     (2006.01)
*H02K 5/136*     (2006.01)

(52) U.S. Cl.
CPC ......... *G01N 33/0027* (2013.01); *H02K 5/136* (2013.01)

(58) Field of Classification Search
USPC ............................................. 73/431
See application file for complete search history.

(56) References Cited

U.S. PATENT DOCUMENTS

| | | | |
|---|---|---|---|
| 6,469,303 B1 * | 10/2002 | Sun | G01N 21/3504 250/338.3 |
| 6,647,783 B2 * | 11/2003 | Wewers | G01N 33/0016 73/431 |
| 9,235,970 B2 * | 1/2016 | Williamson | G08B 17/117 |
| 10,476,305 B2 * | 11/2019 | Freer | H05K 5/0217 |
| 11,187,655 B2 * | 11/2021 | Ryu | G01N 21/3504 |
| 2010/0171506 A1 * | 7/2010 | Norgaard | G01N 27/626 324/156 |
| 2016/0128213 A1 * | 5/2016 | Wöhrstein | G01D 11/245 73/431 |
| 2016/0356474 A1 * | 12/2016 | Jayawardena | H05B 47/105 |

(Continued)

FOREIGN PATENT DOCUMENTS

CN     205301289 U   *   6/2016
CN     206479512 U   *   9/2017

*Primary Examiner* — Walter L Lindsay, Jr.
*Assistant Examiner* — Warren K Fenwick
(74) *Attorney, Agent, or Firm* — CANTOR COLBURN LLP (57) ABSTRACT

Intrinsically safe and explosion proof enclosure platforms for convertible gas detectors are disclosed. In some embodiments, a convertible gas detector comprises a gas sensor, the gas sensor comprising sensor circuit. The gas detector further comprises an enclosure, the enclosure configured to house the sensor circuit. The gas sensor further comprises an end cap, the end cap configured to be detachably connected to the enclosure along a flamepath joint. The gas detector is configured to switch between operating as an explosion proof detector and an intrinsically safe detector responsive to whether the end cap is connected to the enclosure.

12 Claims, 9 Drawing Sheets

(56) References Cited

U.S. PATENT DOCUMENTS

2019/0097834 A1* 3/2019 Dempsey ............. G01D 11/245
2024/0044855 A1* 2/2024 Warner ............. G01N 33/0027
2024/0337640 A1* 10/2024 Warner ............. G01N 33/0027

* cited by examiner

INTRINSICALLY SAFE AND EXPLOSION PROOF ENCLOSURE FOR CONVERTIBLE GAS DETECTORS

CROSS REFERENCE TO A RELATED APPLICATION

The application claims the benefit of U.S. Provisional Application No. 63/262,986 filed Oct. 25, 2021, the contents of which are hereby incorporated in their entirety.

BACKGROUND

The invention relates generally to intrinsically safe and explosion proof enclosure platforms and, more specifically, to intrinsically safe and explosion proof enclosure platforms for convertible gas detectors.

Gas detectors generally come in Intrinsically Safe (I.S.) or explosion-proof versions. An I.S. version of a gas detector usually has a different enclosure than an explosion-proof version because of the expenses associated with the latter. Having different enclosures for different gas detectors may cause an increase in the number of different parts needed, which in turn, may cause an increase in material, labor, and overall costs.

BRIEF DESCRIPTION

Aspects of the disclosure relate to methods, apparatuses, and/or systems for intrinsically safe and explosion proof enclosure platforms for convertible gas detectors.

In some embodiments, a convertible gas detector may comprise a gas sensor including a sensor circuit. The gas detector may further comprise an enclosure configured to house the sensor circuit. The gas detector may further comprise an end cap configured to be detachably connected to the enclosure along a flamepath joint. Responsive to the sensor circuit being intrinsically safe, the gas detector is configured to switch between operating as an explosion proof detector and an intrinsically safe detector responsive to whether the end cap is connected to the enclosure.

In some embodiments, the convertible gas detector is configured such that responsive to connecting the end cap to the enclosure, the gas detector operates as an explosion-proof detector.

In some embodiments, the sensor circuit is intrinsically safe, and responsive to removing the end cap from the enclosure, the gas detector operates as an intrinsically safe gas detector.

In some embodiments, the enclosure comprises a bottom end, and the end cap comprises a base element. The end cap is configured to be detachably connected to the enclosure such that the base element interfaces with the bottom end of the enclosure to form a flameproof joint.

In some embodiments, the enclosure comprises a side wall having an inner wall and an outer wall, and the end cap comprises a projecting element. The end cap is configured to be detachably connected to the enclosure such that the projecting element interfaces with a portion of the outer wall to form a flameproof joint.

In some embodiments the enclosure comprises a side wall having an inner wall and an outer wall, and the end cap comprises a projecting element. The end cap is configured to be detachably connected to the enclosure such that the projecting element interfaces with a portion of the inner wall to form a flameproof joint.

In some embodiments, a method for manufacturing a convertible gas detector comprises providing a gas sensor, the gas sensor comprising sensor circuit; providing an enclosure, the enclosure configured to house the sensor circuit; and providing an end cap, the end cap configured to be detachably connected to the enclosure along a flamepath joint, wherein the convertible gas detector is configured to switch between operating as an explosion proof detector and an intrinsically safe detector responsive to whether the end cap is connected to the enclosure.

Various other aspects, features, and advantages of the invention will be apparent through the detailed description of the invention and the drawings attached hereto. It is also to be understood that both the foregoing general description and the following detailed description are examples and not restrictive of the scope of the invention.

BRIEF DESCRIPTION OF THE DRAWINGS

FIG. 1-A is a cross section view of an example of a convertible I.S. gas detector, in accordance with one or more embodiments.

FIG. 1-B is a cross section view of an example of a convertible explosion-proof gas detector, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure, in accordance with some embodiments, describes enclosures for intrinsically safe and explosion proof convertible gas detectors. Generally, gas detectors use different protection techniques for safely operating in hazardous environments (e.g., when detecting explosive gases). For example, explosion-proof techniques generally use an enclosure configured to withstand and contain any explosion (e.g., caused by high temperature, spark, or malfunction) within the enclosure.

Another technique is the intrinsic safe protection technique. The intrinsic safe protection technique limits the energy used by the control circuits of the gas senor to an energy level threshold. This may render the gas detector incapable of producing enough heat, spark, or any other ignition source to ignite an explosive environment. However, this gas detector configuration only works when the control circuits of the gas sensor are intrinsically safe. In other words, if the user changes the gas sensor, the new gas sensor needs to be intrinsically safe to operate with the gas detector. Otherwise, a different gas detector having an explosion-proof enclosure may be needed. This may be costly and challenging because it may increase the number of different parts for the different detectors (intrinsically safe detectors and explosion-proof detectors).

The present disclosure describes an intrinsically safe and explosion-proof enclosure platform for convertible gas detectors. In some embodiments, the same enclosure may be used, in different configurations, both intrinsically safe and explosion-proof gas detectors. This may provide a convertible gas detector that can be converted from an I.S. to an explosion-proof detector (or vice-versa) based on the configuration of the enclosure. For example, in some embodiments, an intrinsically safe (IS) gas detector, having an IS control board, may include an enclosure configured to receive a gas sensor (sensing interface and control board). In some embodiments, the IS gas detector may be converted to an explosion-proof detector by adding an end cap to the enclosure along the flamepaths. This may be advantageous because it may allow the user to switch gas sensors without having to change the whole gas detector (including the enclosure). For example, in cases where the user wants to detect a different gas with a different sensor that does not meet the IS requirement, the user may be able to use the same enclosure with the end cap configuration to make the gas detector explosion-proof and meet the operation safety requirements.

Similarly, in some embodiments, if the gas sensor of the explosion-proof detector is an IS sensor, or if the gas sensor is changed to an IS sensor (e.g., to detect a different gas), the explosion-proof gas detector may be converted to an IS gas detector by removing the cap of the enclosure. In these cases, the gas detector does not need the end cap of the enclosure to operate or to meet the operation safety requirements.

In some embodiments, the end cap may be operatively connected to the enclosure along a flamepath using one or more explosion-proof techniques. A flamepath may refer to a place where corresponding surfaces, of the enclosure and the end cap, come together to prevent the transmission of an internal explosion to the potentially explosive gas atmosphere around the enclosure. In some embodiments, the end cap and the enclosure connect at a flame-proof joint along the flamepath. The present disclosure describes examples of enclosures, end-caps, and flameproof-joints that can be used for convertible gas detectors herein below. However, these examples are for illustrative purposes only and are not intended to be limiting. Other enclosures, end caps, or joints may be used to accomplish a convertible gas detector and are consistent with the present disclosure.

Figure 1A:
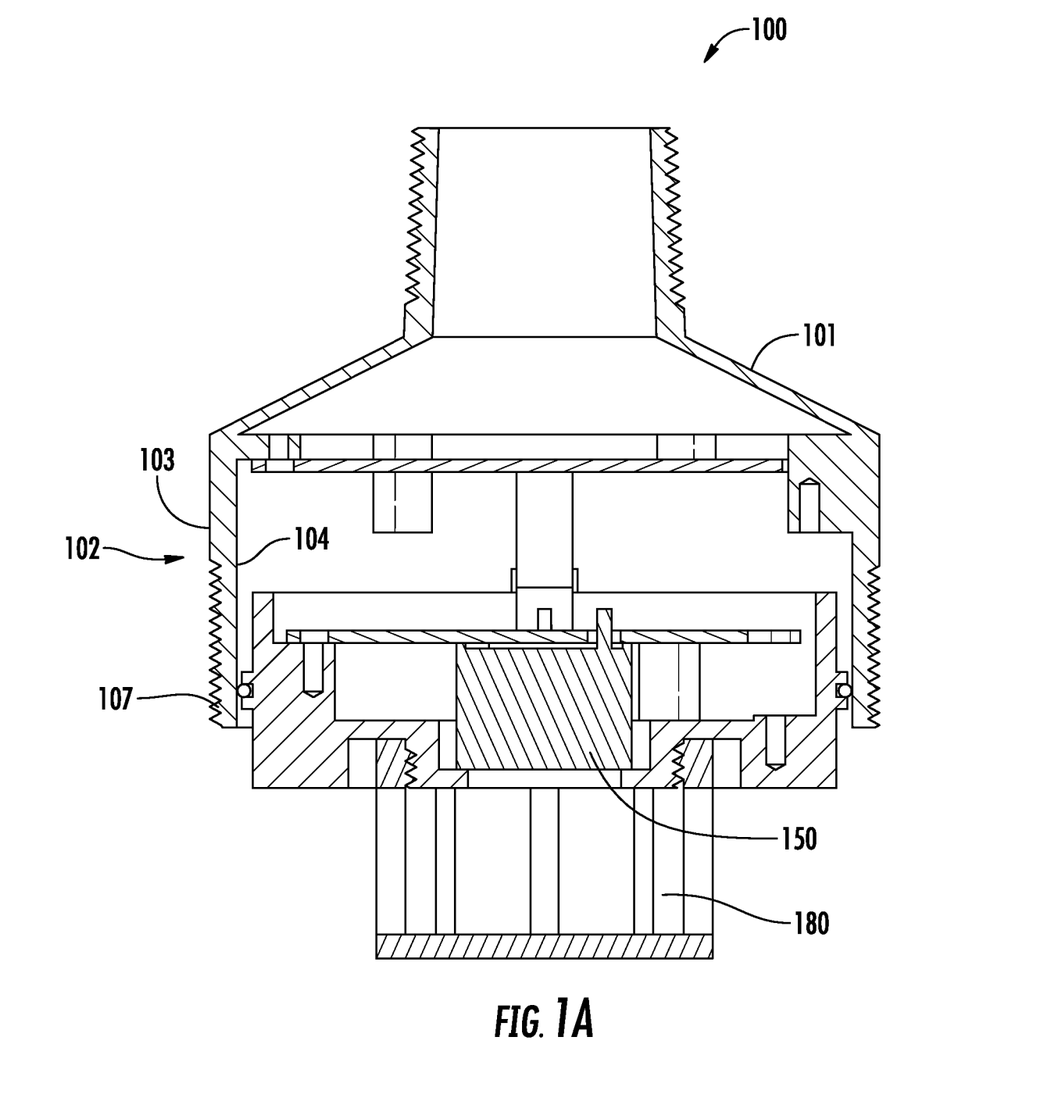
Figure 1B:
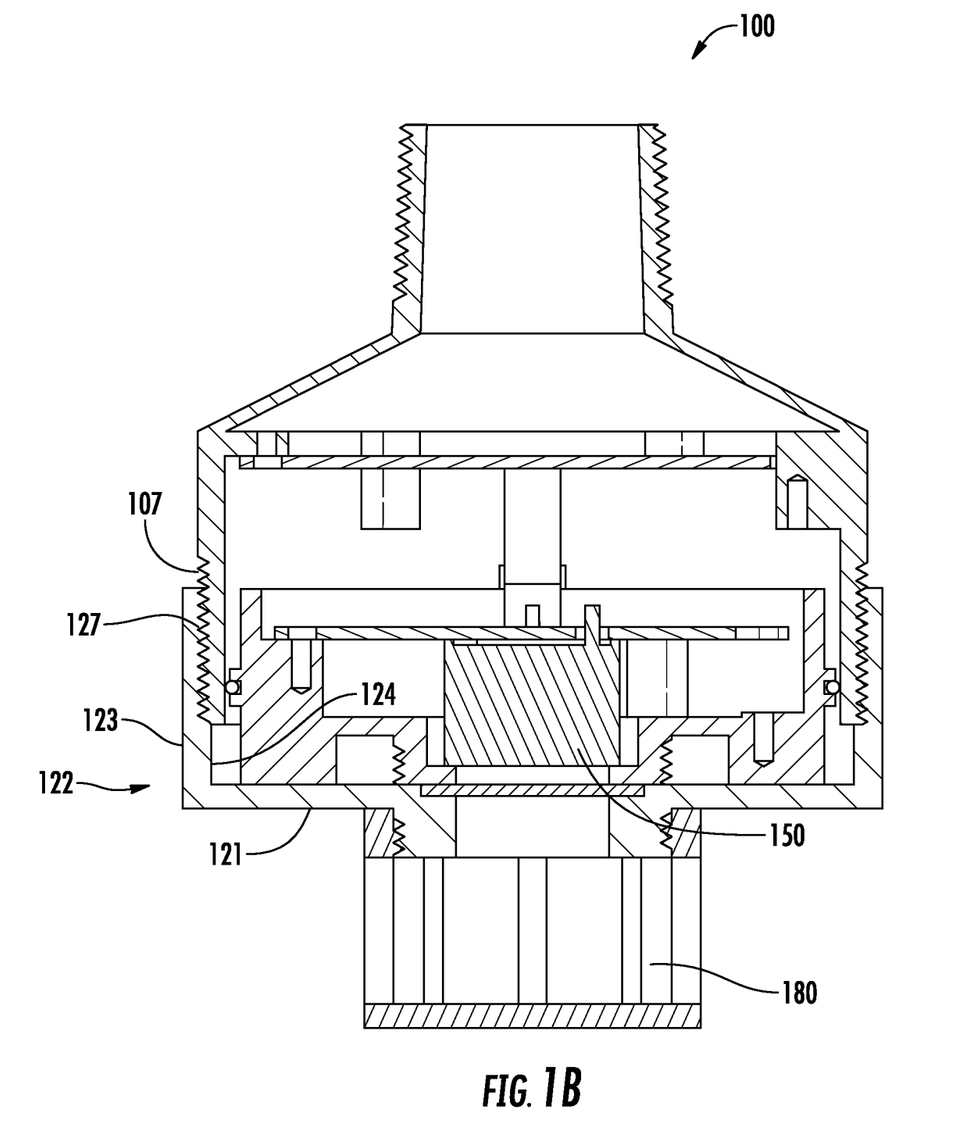

FIG. 1 is a cross section view of an example of a convertible gas detector 100, in accordance with one or more embodiments. In some embodiments, gas detector 100 may include a gas sensor 150. In some embodiments, gas sensor 150 may be configured to detect (or measure) gas within a sensing chamber of the gas detector 100. In some embodiments, gas sensor 150 may be an IS gas sensor having intrinsically safe designed control electronics.

Enclosure 101 may be configured to house one or more components of gas detector 100. In some embodiments, gas sensor 150 may be housed in enclosure 101. In some embodiments, gas sensor 150 may be detachably connected to enclosure 101 to facilitate removal of gas sensor 150 (e.g., for maintenance, repair, malfunction, or if gas detector 100 is used to detect a different gas). In some embodiments, enclosure 101 may include a side wall 102 and bottom end 105. Side wall 102 includes an outer wall 103 and an inner wall 104. In some embodiments, enclosure 101 may be configured to detachably connect with end cap 121 along a flamepath (as explained herein below). Enclosure 101 and end cap 121 may connect along a portion of outer wall 103, inner wall 104, or bottom end 105. As explained below, enclosure 101 and end cap 121 may connect in different ways using explosion-proof techniques. For example, in some embodiments, enclosure 101 may include one or more threads 107 on a lower portion of outer wall 103 (towards bottom end 105). In some embodiments, threads 107 may be configured to mate with one or more threads on end cap 121.

End cap 121 may be configured to be removably connected to enclosure 101. In some embodiments, end cap 121 is configured to interface with enclosure 101 along one or more flamepaths and provide a flameproof joint to prevent any potential explosion inside the enclosure from propagating to the outside of the enclosure. In some embodiments, in addition to the flameproof joint, end cap 121 may be affixed or attached to enclosure 101 at multiple points using multiple connecting means (e.g., bolts, screws, pins, etc.). In the example shown in FIGS. 1-A and B, end cap 121 includes a base element and a side wall 122. Side wall 122 includes an outer wall 123 and an inner wall 124. In some embodiments, end cap 121 may include threads 127 on an inner wall 124. Threads 127 are configured to mate with threads 107 of enclosure 101. Threaded joint 107-127 may provide a flameproof joint configured to prevent the transmission of an internal explosion to the explosive gas atmosphere around enclosure 101. In some embodiments, end cap 121 may be removed from gas detector 100 if gas sensor 150 is an IS sensor. End cap 121 may be affixed to enclosure 101 to convert gas detector 100 to an explosion-proof detector (e.g., if gas sensor 150 is not an IS sensor, or simply for extra precaution).

As mentioned above, end cap 121 and enclosure 101 (or gas detector 100) may be connected at different points in addition to the flamepath. The end cap may include one or more elements configured to interface with the enclosure (or with the gas detector) at these points of connection. For example, end cap 121 may include a lower end element 170, protruding in the opposite direction of side wall 122. Element 170 may be configured to interface with a weather shield 180 of gas detector 100. This disclosure will focus on the connection of the end cap and the enclosure at the flameproof joints. The other connecting points may differ based on the enclosure, the gas detector, presence of weather shields, and the overall design of the gas detector.

FIGS. 2-8 illustrate different examples of flameproof joints that can be used to connect the enclosure and the endcap of a convertible gas detector.

Figure 2:
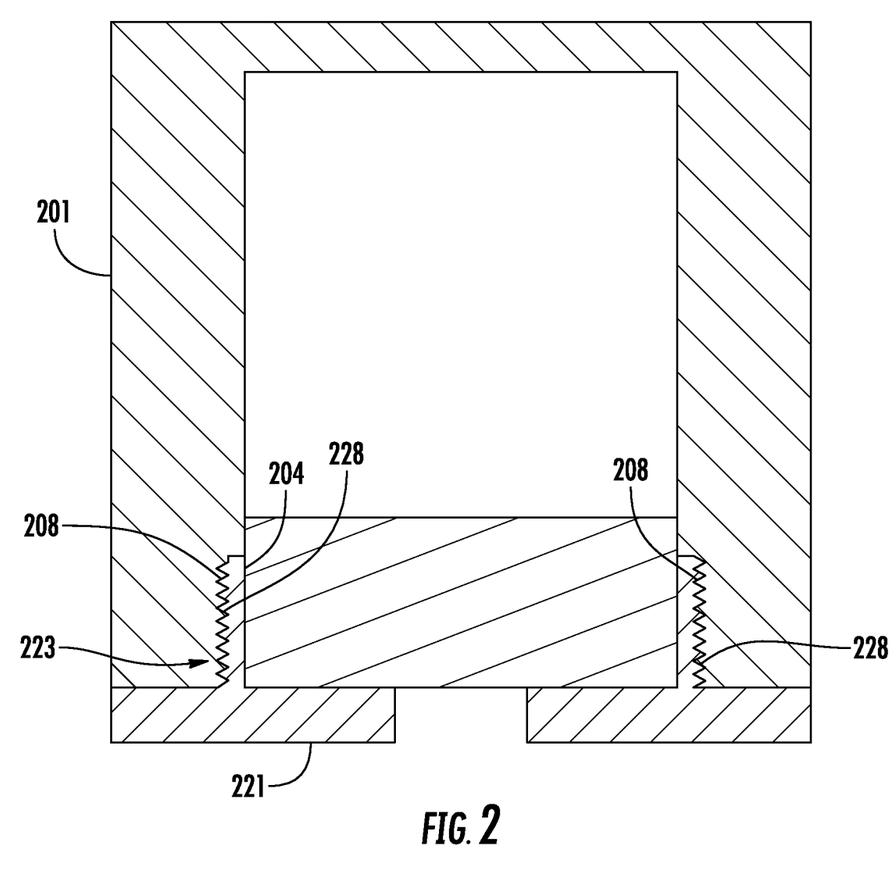
FIG. 2 is a simplified diagram of an example of a convertible gas detector, according to one or more embodiments.

In some embodiments, as shown in FIG. 2, enclosure 201 may include threads 208 on inner wall 204. End cap 221 may include threads 228 on outer wall 223. Threaded joint 208-228 may be configured to provide a flamepath that prevents the transmission of an internal explosion to the explosive gas atmosphere around enclosure 201. In some embodiments, flameproof threaded joint 208-228 may be a cylindrical threaded joint configured such that threads 208 and 228 run parallel relative to its axis of revolution. In some embodiments, not shown in the figures, threaded joint 208-228 may be a tapered threaded joint configured such that the threads run parallel relative to the joint's axis of revolution.

Figure 3:
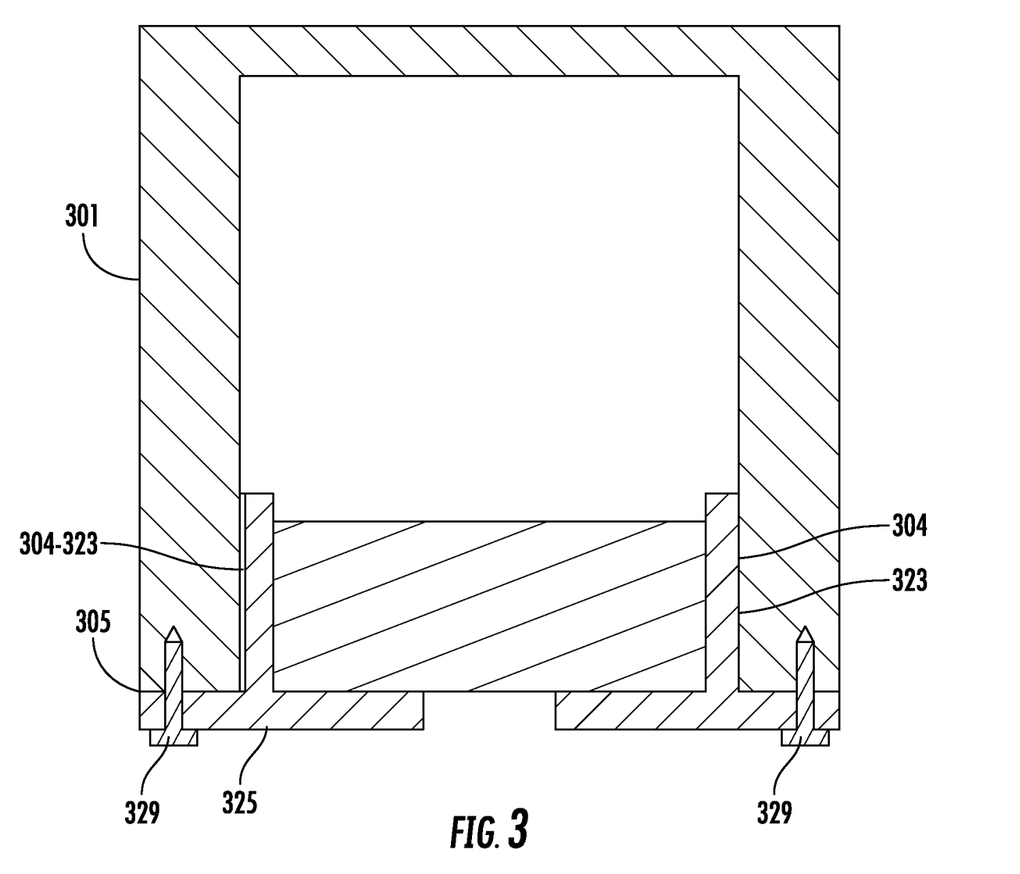
FIG. 3 is a simplified diagram of an example of a convertible gas detector, according to one or more embodiments.

In some embodiments, the end cap may be affixed to the enclosure using a flameproof cylindrical joint having a constrained element that allows relative movement of two parts along a single axis. FIG. 3 shows an example of a cylindrical joint, according to one or more embodiments. In some embodiments, end cap 321 may be connected to enclosure 301 such that base element 325 of end cap 321 is affixed to bottom end 305 of enclosure 301 by pins 329 and such that inner wall 304 of side wall 302 and outer wall 323 of side wall 322 form a cylindrical joint 304-323. Pins 329, in some embodiments, may be screws, bolts, or other connecting means. Cylindrical joint 304-323 may be configured to allow relative movement of the enclosure 301 and end cap 321 along a single axis; which may provide a flamepath that prevents the transmission of an internal explosion to the explosive gas atmosphere around enclosure 301.

Figure 4:
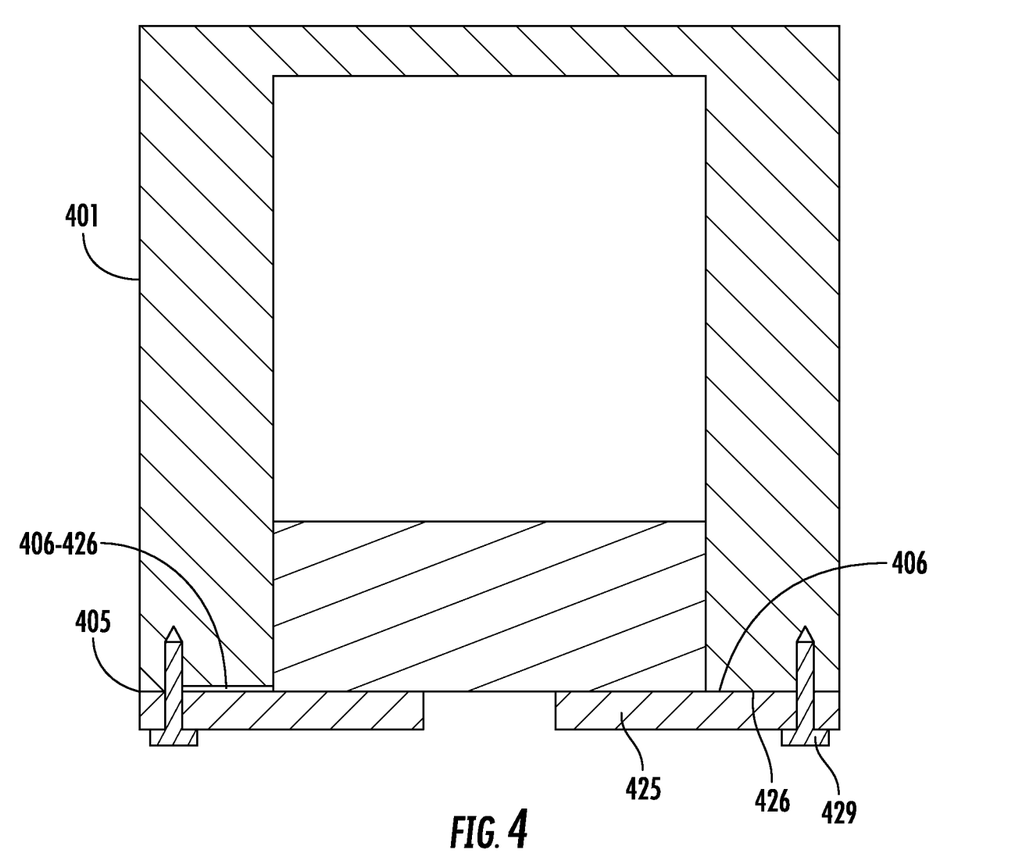
FIG. 4 is a simplified diagram of an example of a convertible gas detector, according to one or more embodiments.

In some embodiments, the end cap may be affixed to the enclosure using a flameproof flanged joint having flanges configured to fasten the enclosure and the end cap. FIG. 4 shows an example of a flanged joint, according to one or more embodiments. In some embodiments, end cap 421 may be connected to enclosure 401 such that base element 425 of end cap 421 is affixed to bottom end 405 of enclosure 401 by pins 429. Pins 429, in some embodiments, may be screws, bolts, or other connecting means. In these cases, end cap 421 does not include a side wall, instead, end cap 421 is formed by base element 425. A flanged joint is formed with a portion 426 of a top surface of base element 425 and a portion 406 of bottom end 405. Flameproof flanged joint 406-426 may be configured to provide a flamepath that prevents the transmission of an internal explosion to the explosive gas atmosphere around enclosure 401.

Figure 5:
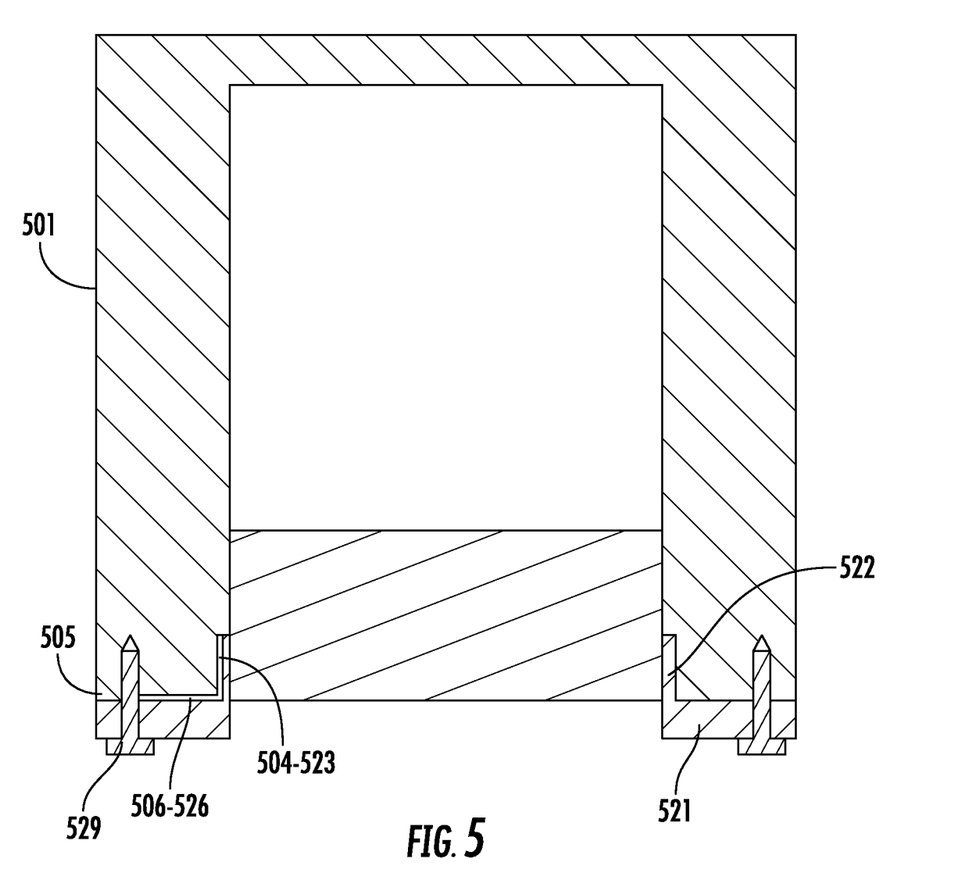
FIG. 5 is a simplified diagram of an example of a convertible gas detector, according to one or more embodiments.

In some embodiments, the end cap may be affixed to the enclosure using a flameproof spigot joint having two adjacent segments and one change of direction. FIG. 5 shows an example of a spigot joint, according to one or more embodiments. In some embodiments, end cap 521 may be connected to enclosure 501 such that base element 525 of end cap 521 is affixed to bottom end 505 of enclosure 501 by pins 529 and such that outer wall 523 of side wall 522 fits a slot formed on bottom end 505 along inner wall 504. Pins 529, in some embodiments, may be screws, bolts, or other connecting means. A portion 526 of a top surface of base element 525 and a portion 506 of bottom end 505 are connected. Flameproof spigot joint formed by 506-526 and 504-523 may be configured to provide a flamepath that prevents the transmission of an internal explosion to the explosive gas atmosphere around enclosure 501.

Figure 6:
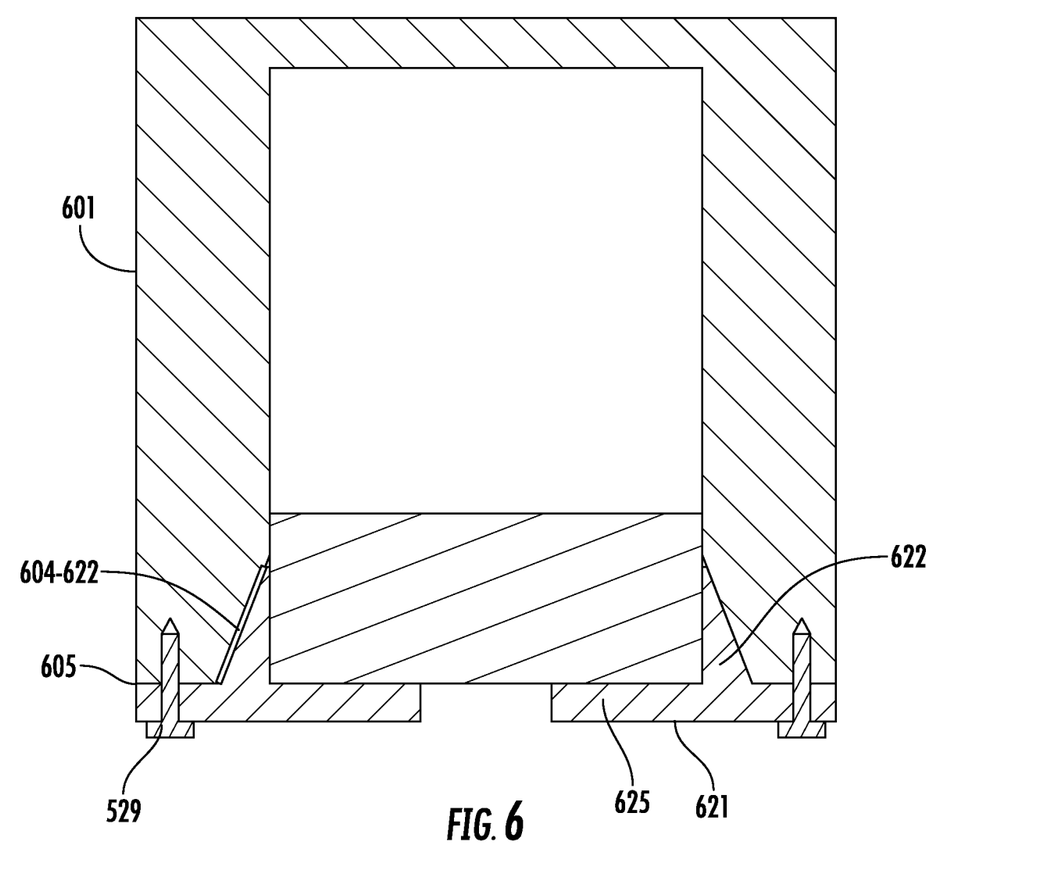
FIG. 6 is a simplified diagram of an example of a convertible gas detector, according to one or more embodiments.

In some embodiments, the end cap may be affixed to the enclosure using a flameproof conical joint configured such that the mating surfaces are conical and the gap normal to the mating surfaces is consistent across the entire surface. FIG. 6 shows an example of a conical joint, according to one or more embodiments. In some embodiments, end cap 621 may be connected to enclosure 601 such that base element 625 of end cap 621 is affixed to bottom end 605 of enclosure 601 (e.g., by pins 629). Pins 629, in some embodiments, may be screws, bolts, or other connecting means. End cap 621 includes a conical projecting member 622 configured to mate with a corresponding surface on inner wall 604 of the enclosure to form a flameproof conical joint. The flameproof conical joint formed by the conical member 622 and corresponding surface provide a flamepath that prevents the transmission of an internal explosion to the explosive gas atmosphere around enclosure 601.

Figure 7:
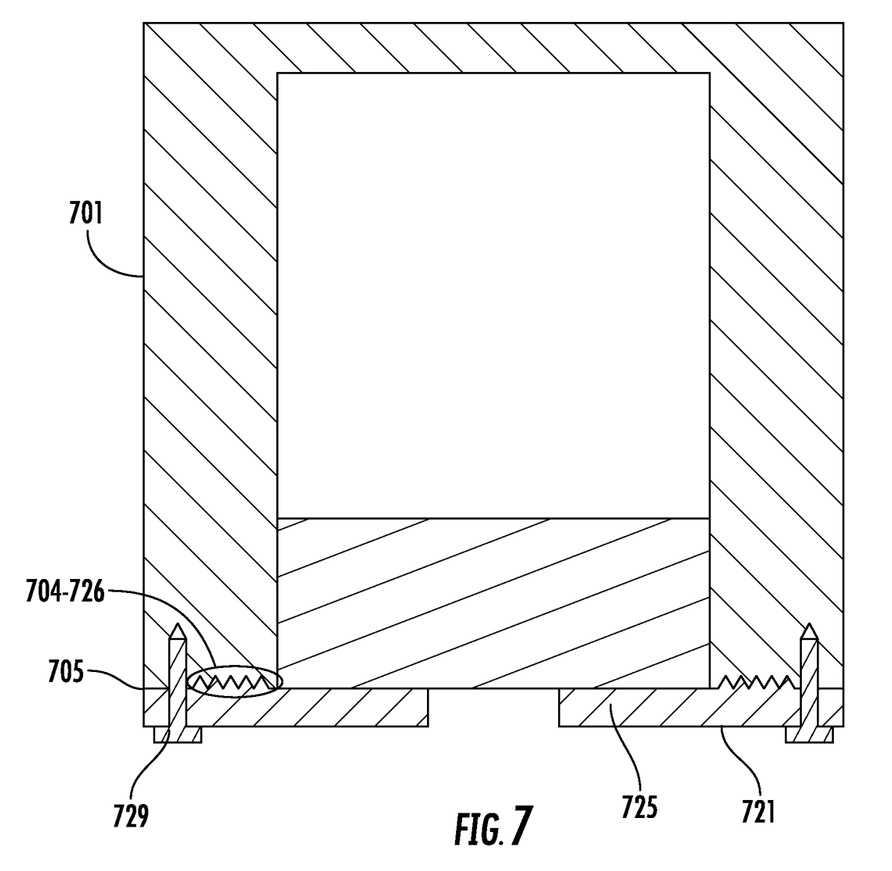
FIG. 7 is a simplified diagram of an example of a convertible gas detector, according to one or more embodiments

In some embodiments, the end cap may be affixed to the enclosure using a flameproof serrated joint having at least five fully engaged serrations. FIG. 7 shows an example of a serrated joint, according to one or more embodiments. In some embodiments, end cap 721 may be connected to enclosure 701 such that base element 725 of end cap 721 is affixed to bottom end 705 of enclosure 701 (e.g., by pins 729). Pins 729, in some embodiments, may be screws, bolts, or other connecting means. End cap 721 includes serrations 726 on a top surface of base element 725 configured to mate with serrations 706 on bottom end 705 of the enclosure. The flameproof serrated joint 706-726 have at least 5 fully engaged serrations. Serrated joint 706-726 may be configured to provide a flamepath that prevents the transmission of an internal explosion to the explosive gas atmosphere around enclosure 701.

Figure 8:
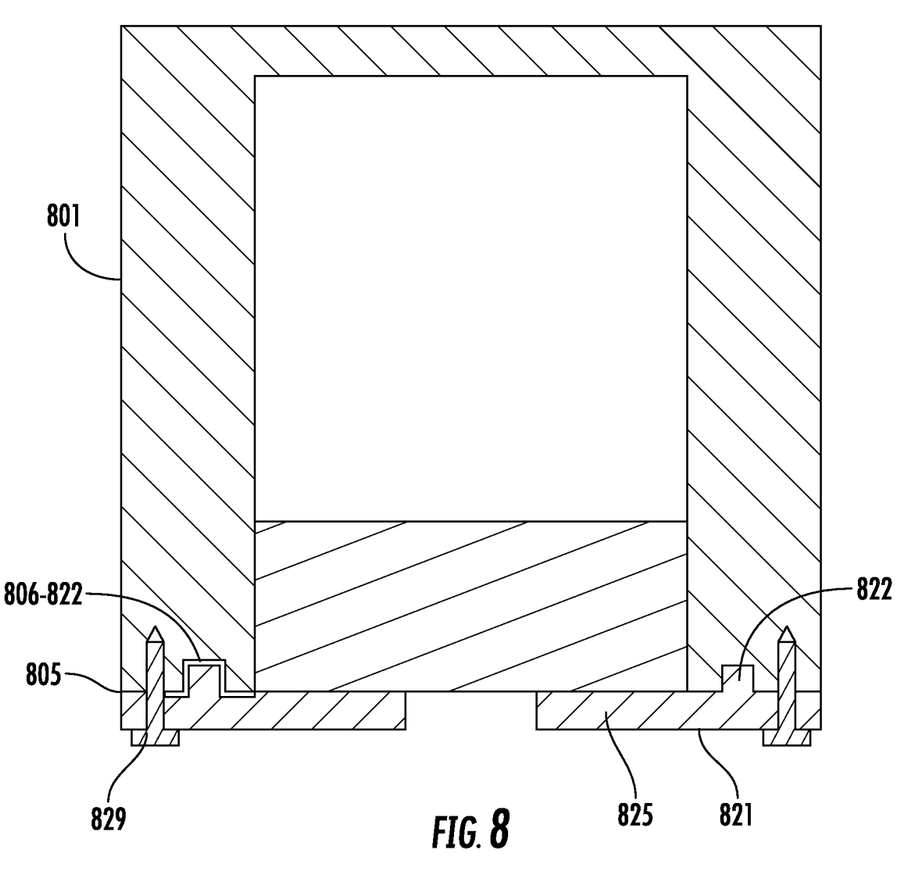
FIG. 8 is a simplified diagram of an example of a convertible gas detector, according to one or more embodiments.

In some embodiments, the end cap may be affixed to the enclosure using a flameproof multistep joint having at least 3 adjacent segments where the flamepath changes direction at least 2 times by 90 degrees. FIG. 8 shows an example of a multistep joint, according to one or more embodiments. In some embodiments, end cap 821 may be connected to enclosure 801 such that base element 825 of end cap 821 is affixed to bottom end 805 of enclosure 801 (e.g., by pins 829). Pins 829, in some embodiments, may be screws, bolts, or other connecting means. End cap 821 includes a projecting member 822 configured to mate with a corresponding surface on bottom end 805 of the enclosure to form a flameproof multi-step joint. The flameproof multi-step joint 806-822 formed by the member 822 and corresponding surface 806 includes at least 3 adjacent segments where the flamepath changes direction at least 2 times by 90 degrees. The flameproof multi-step joint is configured to provide a flamepath that prevents the transmission of an internal explosion to the explosive gas atmosphere around enclosure 801.

It is to be noted that the above examples are for illustrative purposes only and is not intended to be limiting. It will be apparent to those skilled in the art in view of the present disclosure that other methods for removably connecting the end cap and the enclosure with a flameproof joint may be used and are consistent with the present disclosure.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

What is claimed is:

1. A convertible gas detector comprising:
   a gas sensor, the gas sensor comprising a sensor circuit;
   an enclosure, the enclosure configured to house the sensor circuit; and
   an end cap, the end cap configured to be detachably connected to the enclosure along a flamepath joint, wherein
   the gas detector is configured to operate as an explosion proof detector when the end cap is connected to the enclosure, and is configured to operate as an intrinsically safe detector when the end cap is not connected to the enclosure.

2. The convertible gas detector of claim 1, wherein responsive to connecting the end cap to the enclosure, the gas detector operates as an explosion-proof detector.

3. The convertible gas detector of claim 1, wherein responsive to removing the end cap from the enclosure, the gas detector operates as an intrinsically safe gas detector.

4. The convertible gas detector of claim 1, wherein
   the enclosure comprises a bottom end;
   the end cap comprises a base element; and
   the end cap is configured to be detachably connected to the enclosure such that the base element interfaces with the bottom end with of the enclosure to form a flameproof joint.

5. The convertible gas detector of claim 1, wherein
   the enclosure comprises a side wall, the side wall having an inner wall and an outer wall;
   the end cap comprises a projecting element; and
   the end cap is configured to be detachably connected to the enclosure such that the projecting element interfaces with a portion of the outer wall to form a flameproof joint.

6. The convertible gas detector of claim 1, wherein
   the enclosure comprises a side wall, the side wall having an inner wall and an outer wall;
   the end cap comprises a projecting element; and
   the end cap is configured to be detachably connected to the enclosure such that the projecting element interfaces with a portion of the inner wall to form a flameproof joint.

7. A method of manufacturing a convertible gas detector, the method comprising:
   providing a gas sensor, the gas sensor comprising a sensor circuit;
   providing an enclosure, the enclosure configured to house the sensor circuit; and
   providing an end cap, the end cap configured to be detachably connected to the enclosure along a flamepath joint,
   wherein the gas detector is configured to operate as an explosion proof detector when the end cap is connected to the enclosure, and is configured to operate as an intrinsically safe detector when the end cap is not connected to the enclosure.

8. The method of claim 7, wherein responsive to connecting the end cap to the enclosure, the convertible gas detector operates as an explosion-proof detector.

9. The method of claim 7, wherein the sensor circuit is intrinsically safe; and
   responsive to removing the end cap from the enclosure, the gas detector operates as an intrinsically safe gas detector.

10. The method of claim 7, wherein
    the enclosure comprises a bottom end;
    the end cap comprises a base element; and
    the end cap is configured to be detachably connected to the enclosure such that the base element interfaces with the bottom end with of the enclosure to form a flameproof joint.

11. The method of claim 7, the enclosure comprises a side wall, the side wall having an inner wall and an outer wall;
    the end cap comprises a projecting element; and
    the end cap is configured to be detachably connected to the enclosure such that the projecting element interfaces with a portion of the outer wall to form a flameproof joint.

12. The method of claim 7, the enclosure comprises a side wall, the side wall having an inner wall and an outer wall;
    the end cap comprises a projecting element; and
    the end cap is configured to be detachably connected to the enclosure such that the projecting element interfaces with a portion of the inner wall to form a flameproof joint.

* * * * *